March 2, 1971   C. E. MORRIS ET AL   3,567,546
METHOD OF PRODUCING HOLLOW COLLAPSIBLE CONTAINERS
Filed Sept. 20, 1967   3 Sheets-Sheet 1

*Inventors*
Cecil Edward Morris
Ralph William Birch
Edmund Philip Adcock
Neil Malcolm McDonnell
By Cushman, Darby & Cushman
*Attorneys*

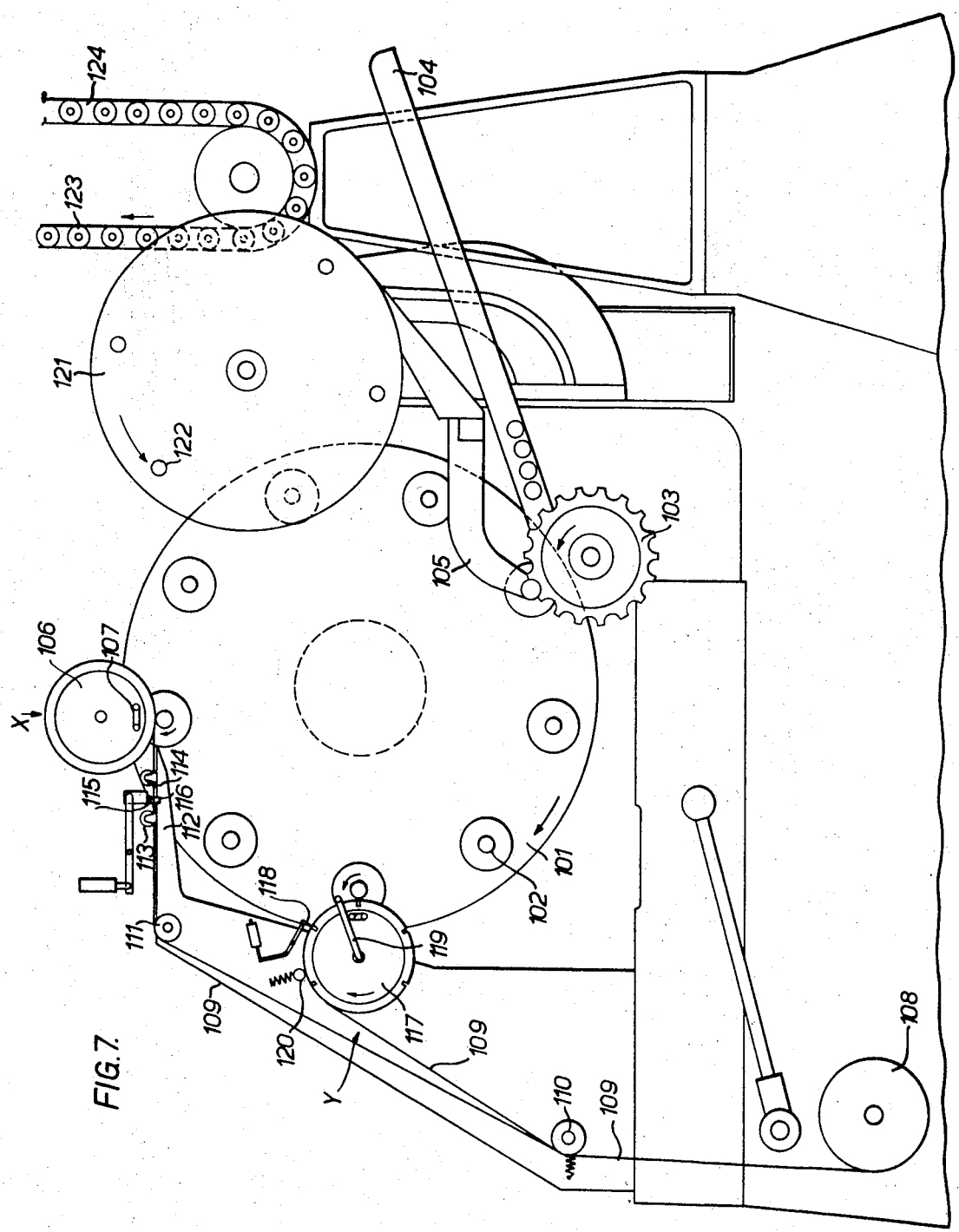

United States Patent Office 3,567,546
Patented Mar. 2, 1971

3,567,546
METHOD OF PRODUCING HOLLOW
COLLAPSIBLE CONTAINERS
Cecil Edward Morris, Bolton, Ralph William Birch, Woking, and Edmund Philip Adcock and Neil Malcolm McDonnell, Harpenden, England, assignors to United Glass Limited, Staines, England
Filed Sept. 20, 1967, Ser. No. 669,063
Claims priority, application Great Britain, Apr. 20, 1967, 18,338/67
Int. Cl. B29c 19/06
U.S. Cl. 156—275                              10 Claims

ABSTRACT OF THE DISCLOSURE

A hollow container is produced by forming a hollow body of thermoplastic material, wrapping a layer of metal foil around the outer surface of the hollow body, and causing the layer of metal foil to adhere to the surface of the hollow body.

---

This invention relates to tubular containers, for example collapsible or flexible tubular containers, and is especially concerned with a process and apparatus for the production thereof.

It is known that flexible tubular containers made from synthetic plastics materials such as polyethylene and polyvinyl chloride are unsuitable for containing certain products because although the material may resist attack by these products the permeability of the plastics material permits constituents such as solvents, water vapour and perfumes to migrate outwardly through the tube walls and/or permits oxygen or other gases to penetrate inwardly and spoil the contents of the container. An additional disadvantage of such containers is that the tube part does not remain collapsed after the expulsion of some of its contents, but tends to expand again once the pressure upon it has been released, air being sucked inwardly through the discharge nozzle.

To overcome these difficulties it has been proposed to make tubular containers from laminated sheet material comprising metal foil sandwiched between layers of heat-sealable thermoplastic material. The bodies or tubular parts of such containers are made by wrapping the laminated sheet around a forming mandrel and heat-sealing overlapping portions of the sheet to form a tubular body. The presence in the wall of the containers so produced of a layer of metal foil renders the tube wall substantially impermeable and also counteracts, at least in part, the tendency of the container to suck in air and re-expand when relieved from pressure.

However, tubes such as these suffer from the defect of showing seams, pronounced or otherwise, so that it is difficult to decorate the tube after forming by the methods usually employed. It is usual in such tubes to decorate the laminate before forming it into a tube but for many applications it is a requirement that decoration be carried out after the tube is formed to give the smooth continuous surface characteristic of normal non-laminated tubular containers, both metal and plastic. Such decoration is normally provided by roller coating a base coat of paint or enamel onto the tube, drying this off in a suitable oven, and then offset or screen printing the desired design or other matter onto the base coat.

One of the objects of the present invention is to provide a tubular container which has a body of at least two plies, one of which is a metal foil, and which can be decorated in the way described above. If the end use does not require that the tube be decorated as described above then of course the foil may be predecorated in the flat by normal methods.

A further defect associated with laminated tubes formed from flat sheet or strip is that there is always a longitudinal seam present on the inner surface of the tube, such seam being in contact with the contents of the tube. Such seams tend to be undermined by the contents, which sometimes penetrate the layers at the seam and cause delamination. A further object of this invention is to provide a tubular container having a laminated body which is free from longitudinal seam marks on the inside surface and which does not suffer from any tendency to delaminate.

Yet a further disadvantage to be found with tubular containers having bodies wound from flat strip or sheet is that the foil necessarily extends the whole length of the body. It is normal to close collapsible tubes at the base after filling with product by means, for example, of heat-sealing apparatus or by ultrasonic vibrations and the foil, extending as it does over the whole length of the tube, can seriously impair the operation and effectiveness of such sealing methods and the seals thus formed. A further object of this invention is to provide a laminated tube wherein the metal foil component can, if required, be stopped short of the base of the tube to leave an end strip of foil-less thermoplastic material, thus permitting the tube to be sealed in the same way as a normal thermoplastic tube.

According to the invention a hollow container is produced by forming a hollow body of thermoplastic material, wrapping a layer of metal foil around the outer surface of the hollow body, and causing the layer of metal foil to adhere to the surface of the hollow body.

The hollow body of thermoplastic material may be a tube formed by any suitable means, for instance by an extrusion technique, whereafter it is cut to the required size. The hollow body, which may be open-ended or not, may also be formed by such techniques as blow moulding, injection moulding, vacuum forming, thermo-forming, compression moulding and the like. In a typical method of producing the container, a hollow thermoplastic tube is extruded and cut to the desired length, a shoulder and nozzle portion are then applied to one end thereof, for example by friction welding, and then the layer of metal foil is wrapped around the tube and is bonded thereto. It is preferred that such bonding be effected by means of induction heating using a radio frequency current.

The thermoplastic material used to form the hollow body may, for example, be any of the thermoplastics normally used in the manufacture of tubes or containers. Examples include olefin polymers and copolymers such as the polyethylenes, polypropylene and ethylene propylene copolymers; styrene polymers and copolymers; polyvinyl chloride, polycarbonates, polyamides and cellulose acetate.

As mentioned above, the container will normally be filled with contents via its base, and in order to facilitate subsequent sealing of the base by conventional means the layer of foil preferably stops a short distance from the base of the tube to leave an area free from foil.

The area free from foil preferably extends a distance not more than 3 mm. measured from the base or open end of the tube and we have found that the effect of this on the impermeability of the tube is negligible, particularly as the area referred to is fused together in the sealing operation. It is possible, notwithstanding what we have said immediately above, for a good seal to be obtained in those cases where the foil extends over the entire length of the thermoplastic tube, particularly when induced heat is used to effect the seal.

One of the defects associated with conventional tubes having laminated bodies is that after storage with the product in the tube permeation through the layer of thermoplastic material may occur and unless there is good adhesion between the various layers delamination may take place. This does not occur in the present invention if the foil is bonded directly to the thermoplastic tube by means of induction heating, i.e. by means of heat induced into the foil itself by means of an induction coil situated at the foil application station of the forming machine.

For certain purposes it is preferred that the inner thermoplastic tube is itself of multi-ply construction, and such a tube may be formed, for example, by extruding a thermoplastic tube, allowing it to solidify substantially, and then extruding a second thermoplastic tube around this, and so on. It is also desirable in certain circumstances that the metal foil or the thermoplastic tube, on their surfaces to be joined, be provided with a coating of thermoplastic material. This material is desirably the same as that of the thermoplastic tube, and under such circumstances an extremely strong bond is obtained between the foil and the tube. Another suitable thermoplastic material which exhibits a high degree of adhesion to foil is sold by E. I. du Pont de Nemours under the trade name "Surlyn A," and is an ionomeric resin containing metal ions and carboxyl groups, and this is particularly effective for coating on the foil if it is required to overlap the foil at its joint. The metal foil, which for example may be a non-ferromagnetic material such as aluminium or tin foil, may be supplied with a thermoplastic coating by means of the method described in copending application Ser. No. 654,130. If the thermoplastic tube is to be provided with a thermoplastic coating, this may be applied by means of the double extrusion method described above.

Preferably, when a multi-ply thermoplastic tube is used, and especially when the plies are of dissimilar thermoplastic materials, one layer is subjected to a pre-treatment by corona discharge before extrusion of the next layer therearound to assist in obtaining a good bond between the two materials. When, at the foil application stage, foil is applied to the outer thermoplastic coating of the tubes by induction heating excellent bonds are obtained between the foil and the coating so that the final tube exhibits good bond strength thermoplastic core/coating/foil and good resistance to delamination.

It is a most desirable characteristic of the finished container that it should have a smooth surface, and this is important not only from the appearance and handling point of view but also from the point of view of ease of decoration. Quite clearly if the metal foil outer layer has a wrinkled appearance it is not satisfactory. In order for a smooth outer surface to be apparent in the finished container the metal foil is preferably wrapped around the thermoplastic tube under pressure.

The invention will now be illustrated by reference to the accompanying drawings wherein FIG. 1 is a diagrammatic face view of an unsealed flexible tubular container;

FIG. 7 is a diagrammatic end view of a fully automatic container forming machine.

Figure 1:
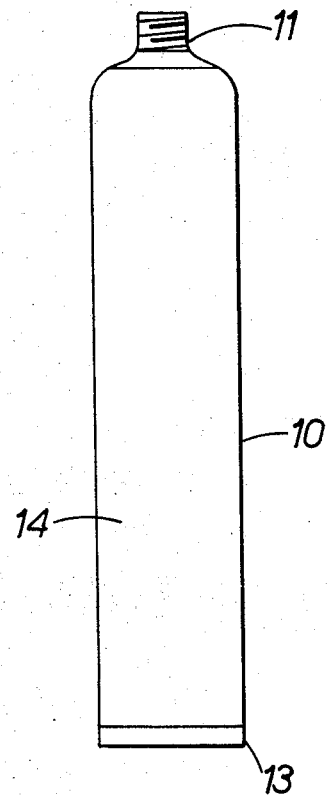
Figure 2:
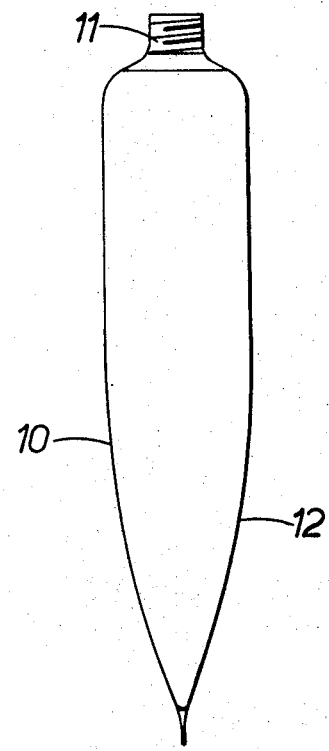
FIG. 2 is a diagrammatic side view of a sealed container.

With reference to FIGS. 1 and 2, a flexible tubular container 10 comprises a shoulder and dispensing nozzle portion 11 and a body portion 12 consisting of an inner thermoplastic tube 13 and an outer layer of metal foil 14. It will be seen that the foil does not extend completely to the base of tube 13 in order that the tube may effectively be sealed by fushion. The inner thermo- plastic tube 13, preferably formed by an extrusion technique, may be provided with the shoulder and nozzle portion as it is itself formed, or the shoulder and nozzle portion may be formed separately and thereafter joined, e.g. by friction welding, to the tube.

Figure 3:
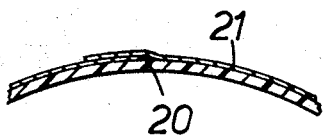
FIG. 3 is a cross-section of a portion of a flexible container.
Figure 4:
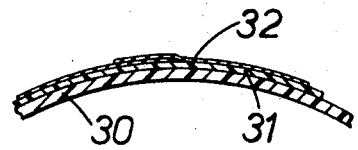
FIG. 4 is a view similar to that of FIG. 3 of an alternative container.

FIG. 3 shows a section of a two-ply container, the inner tube of thermoplastic material, e.g. polythene, being designated 20 and the metal foil outer layer 21. In the embodiment shown in FIG. 4 the container comprises an inner thermoplastic tube 30, an intermediate layer of a thermoplastic material such as a polyethylene resin 31, and an outer layer of metal foil 32. In both FIG. 3 and FIG. 4 the outer metal layer is shown as overlapping at its edges. This need not, of course, be so and for many applications an overlap is undesirable and it is preferred that the edges of the metal foil abut each other.

Figure 5:
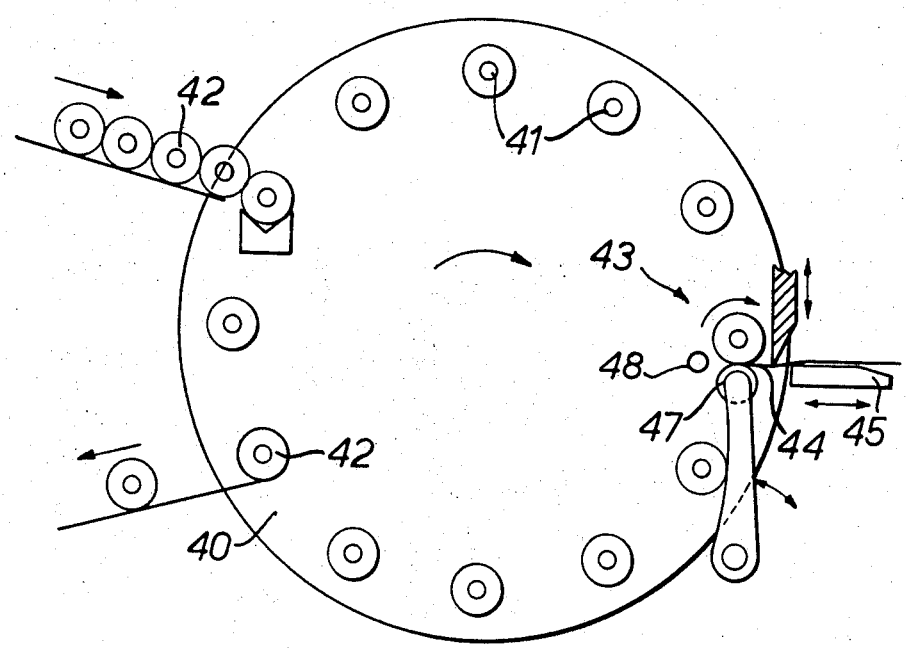
FIG. 5 is a diagrammatic end view of a container forming machine.
Figure 6:
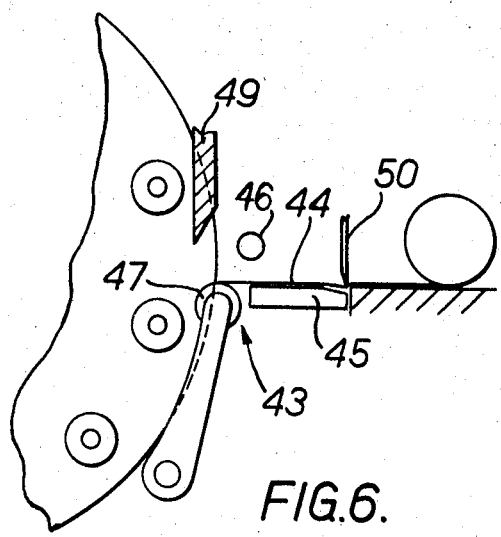
FIG. 6 is a detail of FIG. 5.

With reference to FIGS. 5 and 6, a machine for making tubular flexible containers consists of an intermittently rotatable dial plate 40 carrying a multiplicity of spindles 41 normal to the dial plate. The dial plate revolves in a clock-wise direction and the spindles are rotatable and can be driven at appropriate stations. Plastic tubes 42 as described previously in this text are fed onto the spindles by the normal methods of tube feeding, and the dial plate revolves, carrying the plastic tubes on their appropriate spindles to a foil application stage designated generally 43. Pre-cut foil 44 of the required length is transferred by a reciprocating plate 45 towards the tube and passes under an induction coil 46 that induces sufficient heat into the foil at its leading edge to soften the coating on the foil or the coating on the tube or the plastic body of the tube itself if neither the foil or the tube carry coatings. The leading edge of the foil is picked up by the tube which is now revolving, the spindle carrying the tube being driven at this station. The tube contacts an idling roller 47 so that the foil is wrapped smoothly around the periphery of the tube whilst further heat is induced into the foil by a further induction coil 48 mounted parallel to the axis of the tube, thus ensuring that softening and welding occur. The trailing edge of the cut piece of foil is held under slight pressure by a knife 49 during the rolling on stage so that the foil is under slight tension and hence is applied smoothly without curling or wrinkling. The machine then indexes and a further tube and spindle move into the foil application station.

Foil of the correct width to give the necessary tube coverage, leaving a sealing area at the base of the tube if necessary, is fed from a reel by reciprocating mechanisms synchronized with the movement of the machine to a guillotine 50 the stroke of which is also synchronized with the foil application station of the machine. One pre-cut foil is thus picked up from the guillotine at the return end of the stroke of the moving applicator plate 45. Registration is effected by means of photo-electric cells (not shown). The cut of the foil is so arranged that after wrapping the edges may abut or there may be a slight overlap. In any case because of the thinness of the foil, which may be less than .023 mm., the joint of overlap appears only as a hairline and does not influence subsequent decoration if this is required.

FIG. 7 illustrates a further automatic machine for producing metal foil-thermoplastic tubular containers by wrapping metal foil around already-formed plastic tubes. The apparatus shown in FIG. 7 in fact includes two alternative foil-application stations, and it will be understood that in practice one or the other is used, but not both.

The machine comprises a vertically-mounted circular plate 101, intermittently driven by means of a conventional Geneva wheel drive system (not shown). Plate 101 is provided with a series (nine in all) of rotatable spindles 102, which spindles are mounted normal to the plate and are adapted to carry tubes from a pick-up station, through a foil application station to a take-off station. At the pick-up station is mounted a rotatable star wheel 103 which receives open-ended thermoplastic tubes (normally formed on an extrusion machine and subsequently provided with shoulder and nozzle portions) from an inclined tray or chute 104. The star wheel 103 is spaced horizontally from the plate 101 so that an arm 105 may move horizontally backwards and forwards to slide a tube off the star wheel 103 and onto a spindle 102.

Situated at position X is a foil application roll 106, which is provided with a heat-resisting outer covering of, for example, rubber or a silicone material. Roll 106 is adapted to be rotated, and is provided interiorly with a work coil 107 which is connected to a source of radio frequency current, e.g. to an R.F. generator. A differentially driven roll 108 of metal foil 109 supplies foil via a tension roller 110 and an idler roller 111 for passage between a lead-in shelf 112 and two foil-feed rollers 113, 114. Situated between rollers 113 and 114 is a guillotine blade 115, which cooperates with a slot 116 in shelf 112 to cut off a suitable and pre-determined length of foil when operated by means of, for example, a solenoid mechanism or a pneumatic or hydraulic cylinder.

Situated at the alternative foil-application station Y is a foil application roll 117, which is similar to the roll 106 but has a number of slots formed in its surface which cooperate with a guillotine blade 118 in order to sever from the foil supply a suitable length of foil. Roll 117 is provided with a foil restraining arm 119 which maintains the foil in contact with the roll. Such contact is also maintained by means of the spring-loaded roller 120.

The take-off mechanism comprises a rotatable plate 121 provided with a number of spindles schematically shown and designated 122. Plate 121 is also provided with a horizontally reciprocable arm (not shown) which removes the tubes from off spindles 102 and places them on spindles 122 in similar fashion to arm 105. Mechanism is also provided for removing the tubes from the spindles 122 and placing them on further spindles 123 on a conveyor belt 124.

The operation of this machine will firstly be described in relation to the use of the foil application mechanism designated X. Thermoplastic tubes, formed on an extruder and provided with neck and nozzle portions, are fed one by one from the chute 104 onto the star wheel 103. As mentioned above, the main plate 101 and the star wheel 103 are intermittently driven, and they will both be stationary when a tube carried by star wheel 103 is in alignment with one of the spindles 102. At this point the arm 105 will be actuated to push the tube onto the spindle 102, and will then move back to its initial position for subsequent movement of a further tube. Plate 101 is then indexed to its next position. It will be appreciated that the main plate 101 is driven in a clockwise direction and the star wheel 103 in an anti-clockwise direction.

As each tube-carrying spindle arrives at station X, the rotational movement of the plate 101 is interrupted, and the tube, which it will be understood is a tight fit on the spindle, comes into contact with the foil application roll 106. At this point the guillotine 115 is actuated to sever a length of foil equivalent to (or slightly in excess of) the circumference of the tube and roller 114 is driven to pass the severed length of foil between the tube and roller 106. Roller 106 is then caused to rotate and at the same time the induction coil 107 is energised. The spindle 102 with its thermoplastic tube is caused to rotate, either by friction or by direct drive, and the metal foil is adhered to the tube by virtue of the fact that the heat induced into the metal foil by means of the R.F. induction coil softens or melts the surface of the thermoplastic tube sufficiently to adhere the foil to the tube. When this has been done the induction coil is switched off, roller 106 ceases to rotate and the plate 101 indexes to its next position. Rollers 113 and 114 at this time operate to cause a further length of metal foil to be in position for application to the next tube on the plate.

As the foil-coated tube stops at the take-off station the horizontally reciprocable arm provided thereat removes the tube from spindle 102 and places it on spindle 122. Plate 121 then indexes in an anti-clockwise direction, and the foil-coated tubes are deposited in turn by means of a similar horizontally reciprocable arm on the conveyor 124.

When using the alternative foil application station Y, the operation of the machine is generally similar but the foil is cut by cooperation of the guillotine with the slots disposed around the periphery of the roll 117. It will be appreciated that the distance between two adjacent slots on the roller is equivalent to the desired length of metal foil.

The method of induction heating using induction coils energised from R.F. or other generators is more precisely described in copending applications Ser. Nos. 511,897 and 654,130. Although tubes having a discharge nozzle situated at the opposite end from the open base are particularly mentioned, the above technique may, as mentioned briefly above, be applied to other containers which have an approximately circular cross-section such as tablet containers or plastic bottles which may be made by injection moulding, blow moulding, by welding a base onto an extruded or moulded body, or by any other method such as described hereinabove. The application of foil to such containers increases their field of use because of the increased resistance to permeability and increased light barrier properties. A further advantage is that the wall thickness of the plastic component of the laminated containers may be considerably reduced in comparison with conventional containers, without losing any of the rigidity normally associated therewith. For example, whereas conventional blow-moulded hollow thermoplastic containers usually have an average wall thickness of the order of 0.56 to 0.75 millimetre, containers having comparable rigidity characteristics may be produced in accordance with the present invention wherein the inner thermoplastic body has a wall thickness of the order of 0.25 millimetre and the outer metal foil layer has a thickness of 0.015 to 0.05 millimetre.

What is claimed is:

1. A method of producing a hollow collapsible container which comprises the steps of:
    forming a seamless hollow container body of thermoplastic material,
    locating said hollow body on a spindle on which it is a tight fit,
    wrapping a layer of metal foil around the outer surface of said hollow body,
    pressing said foil against the outer surface of said hollow body, and
    inducing radio frequency current in said layer of metal foil thereby heating said layer and causing said foil to adhere to said surface of said hollow body as a result of said heating.

2. A method according to claim 1 wherein said hollow body of thermoplastic material is a tube formed by extrusion.

3. A method according to claim 2 wherein said tube is provided with a shoulder and nozzle portion and is open at the base thereof.

4. A method according to claim 1 wherein said surface of said hollow body is caused to melt.

5. A method according to claim 1 wherein said layer is wrapped around said hollow body such that an area free from foil is exposed at the base of said hollow body.

6. A method according to claim 1 wherein at least one of said hollow body and said layer is provided with a thermoplastic coating.

7. A method according to claim 1 wherein said hollow body has a wall thickness of from 0.25 to 0.8 millimetre.

8. A method according to claim 1 wherein said layer has a thickness of from 0.015 to 0.05 millimetre.

9. A method according to claim 1 wherein said layer of metal foil is selected from the class consisting of aluminium foils and tin foils.

10. A method of producing a flexible hollow container which comprises steps of:
(i) forming by extrusion a hollow tube of synthetic thermoplastic material,
(ii) welding on to one end of said tube a shoulder and nozzle portion,
(iii) locating said tube on a spindle on which it is a tight fit,
(iv) wrapping around said tube a foil selected from the class consisting of tin foils and aluminum foils such that a foil-free portion is exposed at the end of the tube remote from said shoulder and nozzle portion,
(v) Pressing said foil against said tube,
(vi) heating said foil by means of an induced radio frequency current to cause said foil to adhere to said tube,
(vii) sealing said tube at said foil-free portion.

References Cited

UNITED STATES PATENTS

| | | | |
|---|---|---|---|
| 1,831,751 | 11/1931 | Rado | 161—(MF) |
| 2,383,230 | 8/1945 | Voke | 156—218X |
| 2,440,339 | 4/1948 | Langer | 161—(MF) |
| 3,078,201 | 2/1963 | Christie | 161—(MF) |
| 3,290,198 | 12/1966 | Lux et al. | 156—198 |
| 2,502,638 | 4/1950 | Becht | 156—188 |

SAMUEL W. ENGLE, Primary Examiner

U.S. Cl. X.R.

156—187, 215, 380, 446